(12) United States Patent
Sera et al.

(10) Patent No.: US 11,970,098 B2
(45) Date of Patent: Apr. 30, 2024

(54) CENTER CONSOLE STRUCTURE FOR VEHICLE

(71) Applicant: Mazda Motor Corporation, Hiroshima (JP)

(72) Inventors: Naohiro Sera, Aki-gun (JP); Osamu Ueda, Aki-gun (JP); Narumi Nahara, Aki-gun (JP); Kouji Furukawa, Aki-gun (JP); Shohei Kuroda, Aki-gun (JP); Hiroshi Ohno, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 340 days.

(21) Appl. No.: 17/521,903

(22) Filed: Nov. 9, 2021

(65) Prior Publication Data
US 2022/0194279 A1    Jun. 23, 2022

(30) Foreign Application Priority Data

Dec. 22, 2020 (JP) ................................. 2020-212450

(51) Int. Cl.
    *B60R 7/04*            (2006.01)
    *B60N 2/75*            (2018.01)
    (Continued)

(52) U.S. Cl.
    CPC ................ *B60N 2/797* (2018.02); *B60R 7/04* (2013.01); *B60R 11/02* (2013.01); *B60R 16/03* (2013.01); *B60R 2011/0007* (2013.01)

(58) Field of Classification Search
    CPC .. B60R 7/04; B60R 7/06; B60R 11/02; B60R 16/03; B60N 2/75; B60R 2011/0007;
    (Continued)

(56) References Cited

U.S. PATENT DOCUMENTS

| 8,528,956 | B1 | 9/2013 | Winiger et al. |
| 9,096,177 | B2 | 8/2015 | Boundy et al. |

(Continued)

FOREIGN PATENT DOCUMENTS

| CN | 104228692 A | 12/2014 |
| CN | 104349939 A | 2/2015 |

(Continued)

OTHER PUBLICATIONS

Office Action dated Jun. 16, 2023, in corresponding Chinese patent Application No. 202111184955.3, 9 pages.

(Continued)

*Primary Examiner* — Dennis H Pedder
(74) *Attorney, Agent, or Firm* — XSENSUS LLP

(57) ABSTRACT

The center console structure for a vehicle includes a console body; an armrest; and a power supply section that wirelessly transmits electric power to the mobile terminal via a placement surface on which the mobile terminal is placed. The console body includes a top plate section serving as an upper surface; a terminal accommodation section having the placement surface and arranged on a vehicle rear side of the top plate section and on a vehicle lower side of the armrest; and a right and left pair of console side surface sections arranged to oppose each other in a vehicle width direction with the terminal accommodation section being interposed therebetween.

7 Claims, 9 Drawing Sheets

(51) Int. Cl.
*B60R 11/02* (2006.01)
*B60R 16/03* (2006.01)
*B60R 11/00* (2006.01)

(58) Field of Classification Search
CPC . B60N 2/793; H02J 50/10; H02J 50/80; H02J 7/0044
USPC ...... 296/24.34, 37.8; 320/108, 113, 114, 115
See application file for complete search history.

(56) References Cited

U.S. PATENT DOCUMENTS

| | | | |
|---|---|---|---|
| 9,680,532 B2* | 6/2017 | Niec | H02J 7/0044 |
| 2010/0090491 A1 | 4/2010 | Hipshier et al. | |
| 2013/0038279 A1 | 2/2013 | Seyerle et al. | |
| 2013/0249231 A1 | 9/2013 | Winiger et al. | |
| 2014/0361567 A1* | 12/2014 | Singh | B60R 7/04 296/37.8 |
| 2017/0259749 A1 | 9/2017 | Okinaga et al. | |
| 2020/0290518 A1 | 9/2020 | Yumura | |

FOREIGN PATENT DOCUMENTS

| | | |
|---|---|---|
| CN | 107176105 A | 9/2017 |
| CN | 111688585 A | 9/2020 |
| DE | 102012213473 A1 | 2/2013 |
| JP | 2013-241037 A | 12/2013 |
| KR | 2021-0065825 A | 6/2021 |

OTHER PUBLICATIONS

European search report dated on Apr. 11, 2022, in corresponding European patent Application No. 21210127.3, 2 pages.

* cited by examiner

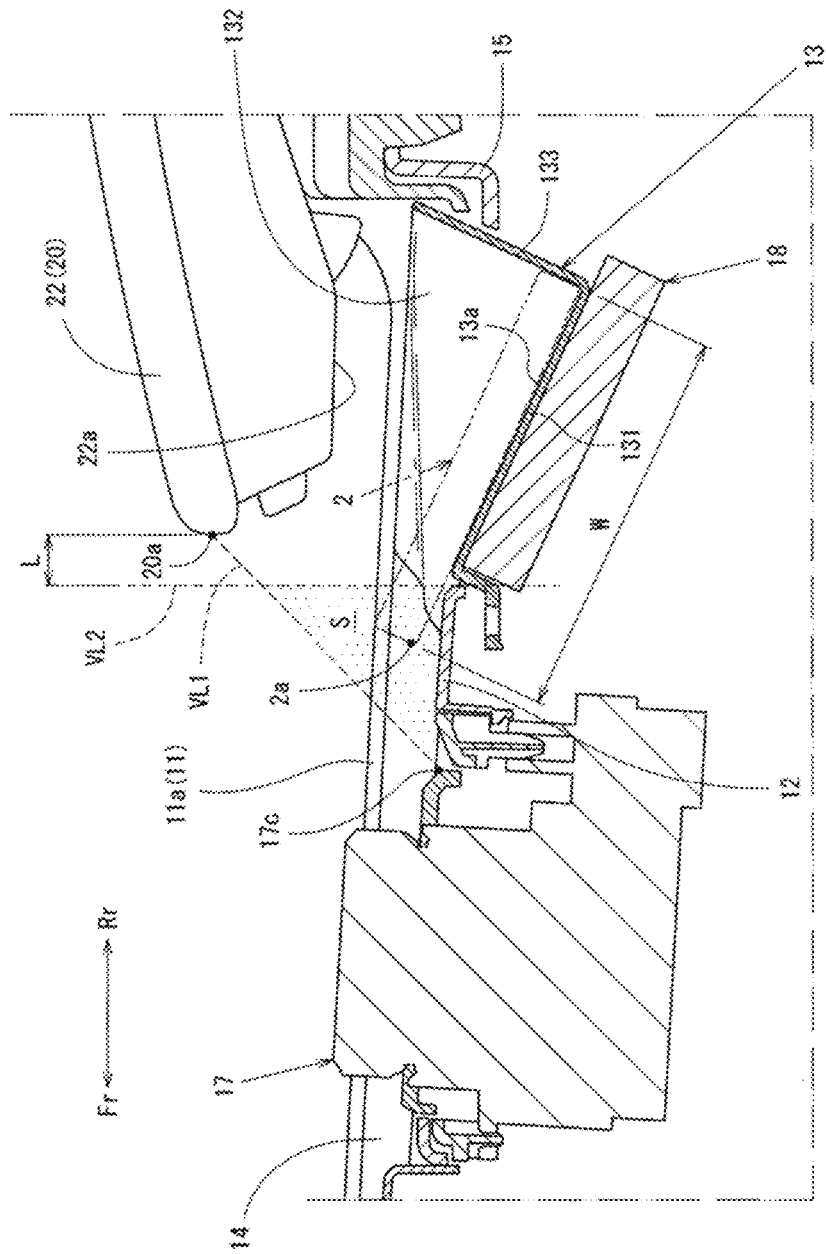

CENTER CONSOLE STRUCTURE FOR VEHICLE

CROSS-REFERENCE TO RELATED APPLICATION

The present application claims priority to Japanese application number 2020-212450 filed in the Japanese Patent Office on Dec. 22, 2020, the entire contents of which is incorporated herein by reference.

TECHNICAL FIELD

The present disclosure relates to a center console structure that includes, as a charger charging a mobile terminal, for example, a power supply section wirelessly transmitting electric power to the mobile terminal.

BACKGROUND

In recent years, with wide use of mobile terminals such as smartphones, some vehicles such as automobiles include a charger that charges the mobile terminal.

For example, a center console structure for a vehicle is disclosed in Patent document 1. In the center console structure for the vehicle, a terminal accommodation section, on which the mobile terminal is placed, and a power supply section that wirelessly transmits electric power to the mobile terminal via the terminal accommodation section are arranged in a console box.

Furthermore, in this Patent document 1, a fixing section that holds the mobile terminal with the terminal accommodation section is provided to a lower surface of an armrest serving as a lid of the console box, and is projected to a vehicle lower side. In this way, in Patent document 1, displacement of the mobile terminal during travel of the vehicle is prevented. As a result, the mobile terminal can stably be supplied with the electric power.

By the way, every time getting into/off the vehicle, for example, an occupant has to open/close the armrest to place/take out the mobile terminal in/from the console box. Thus, the center console structure for the vehicle disclosed in Patent document 1 has a problem of being inconvenient.

To solve such a problem, for example, it is considered to provide the terminal accommodation section in a front portion of the center console or to an instrument panel so as to facilitate placement/taking out the mobile terminal, which improves convenience.

However, in this case, the mobile terminal that is being charged is possibly caught in the occupant's eyesight, which produces another non-preferred problem of inattentive driving.

PATENT DOCUMENTS

Patent Document 1: U.S. Pat. No. 9,096,177

SUMMARY

Problems to be Solved

In view of the above-described problems, the present disclosure has a purpose of providing a center console structure for a vehicle that facilitates placement/taking out of a mobile terminal and can charge the mobile terminal while inhibiting inattentive driving by an occupant.

Solutions for Solving the Problems

The present disclosure is a center console structure for a vehicle including: a console body that extends in a vehicle front-rear direction in a vehicle cabin; an armrest that is arranged on a vehicle upper side of the console body; and a power supply section that wirelessly transmits electric power to a mobile terminal via a placement surface on which the mobile terminal is placed. The console body includes: a top plate section serving as an upper surface in a front portion of the console body; a terminal accommodation section that has the placement surface, is arranged on a vehicle rear side of the top plate section and on a vehicle lower side of the armrest, and serves as an upper surface of the console body; and a right and left pair of console side surface sections arranged to oppose each other in a vehicle width direction with the terminal accommodation section being interposed therebetween. A lower surface of the armrest that opposes the terminal accommodation section is formed at a position that is separated to the vehicle upper side from an upper end of the console side surface section and an upper end of the terminal accommodation section by a longer specified distance than a thickness of the mobile terminal.

According to the present disclosure, the center console structure for the vehicle can facilitate placement/taking out of the mobile terminal and can charge the mobile terminal while inhibiting inattentive driving by an occupant.

More specifically, since the armrest is located on the vehicle upper side of the terminal accommodation section, in the center console structure for the vehicle, the armrest can be interposed between the mobile terminal that is being charged and the occupant's head.

Accordingly, even when the occupant who is driving moves his/her line of sight to the mobile terminal that is being charged, for example, in the center console structure for the vehicle, the armrest can hide the mobile terminal from the occupant's eyesight.

Furthermore, since the lower surface of the armrest and the upper end of the console side surface section are mutually separated by the longer vertical distance than the thickness of the mobile terminal, in the center console structure for the vehicle, an opened space can be formed along the vehicle width direction at a position between the armrest and the console side surface section.

Moreover, since the lower surface of the armrest and the upper end of the terminal accommodation section are mutually separated by the longer specified distance than the thickness of the mobile terminal, in the center console structure for the vehicle, an opened space can be formed along the vehicle front-rear direction at a position between the armrest and the terminal accommodation section.

Accordingly, the occupant can place/take out the mobile terminal along the vehicle front-rear direction or place/take out the mobile terminal along the vehicle width direction without opening/closing the armrest, for example.

In this way, compared to a case where the terminal accommodation section is provided in a console box, the center console structure for the vehicle can facilitate placement/taking out of the mobile terminal and can charge the mobile terminal while inhibiting the inattentive driving by the occupant.

As an aspect of the present disclosure, in plan view, the power supply section may be arranged to overlap both of the armrest and the placement surface of the terminal accommodation section.

With this configuration, in the center console structure for the vehicle, the armrest can reliably be interposed between the mobile terminal that is being charged and the occupant's head.

Thus, the center console structure for the vehicle can reliably hide the mobile terminal from the occupant's eyesight.

In this way, the center console structure for the vehicle can reliably inhibit the inattentive driving by the occupant without interfering with placement/taking out of the mobile terminal.

As another aspect of the present disclosure, the placement surface of the terminal accommodation section may be formed as an inclined surface that continues from the top plate section and is inclined such that a rear end thereof is located on the vehicle lower side with respect to a front end.

With this configuration, compared to a case where the placement surface of the terminal accommodation section is substantially horizontal, the center console structure for the vehicle can further facilitate placement/taking out of the mobile terminal along the vehicle front-rear direction.

Furthermore, compared to the case where the placement surface of the terminal accommodation section is substantially horizontal, it is possible to suppress extension of a length of the placement surface in the vehicle front-rear direction. Thus, the center console structure for the vehicle can downsize the terminal accommodation section.

As a result, the center console structure for the vehicle can suppress a reduction in capacity of the console box caused by the terminal accommodation section, for example, in the case where the console box is arranged on the vehicle rear side of the terminal accommodation section. In this way, the center console structure for the vehicle can further facilitate placement/taking out of the mobile terminal without degrading functionality of the console body.

As another aspect of the present disclosure, the terminal accommodation section may include a right and left pair of side wall portions vertically provided to the vehicle upper side from both ends in the vehicle width direction of the placement surface, the console body may include a decorative panel that is adjacently located on the vehicle front side of the side wall portion of the terminal accommodation section in a manner to continue from the side wall portion, and the side wall portion may be formed in a shape that has a front end located on the vehicle front side of the front end of the placement surface.

With this configuration, the center console structure for the vehicle can suppress degraded appearance of the console body, which is associated with placement/taking out of the mobile terminal.

More specifically, for example, in the case where the front end of the placement surface and the front end of the side wall portion are located at substantially the same positions in the vehicle front-rear direction, at the time when the mobile terminal is placed on the placement surface in the vehicle width direction, the mobile terminal possibly comes in contact with the decorative panel and scratches the decorative panel.

To handle such a problem, the front end of the side wall portion is located on the vehicle front side of the front end of the placement surface. Accordingly, even in the case where the mobile terminal is placed on the placement surface in the vehicle width direction, the center console structure for the vehicle can suppress a scratch on the decorative panel by the side wall portion of the terminal accommodation section.

Therefore, the center console structure for the vehicle can suppress the degraded appearance of the console body, which is associated with placement/taking out of the mobile terminal.

As another aspect of the present disclosure, in a perpendicular cross section along the vehicle width direction, the lower surface of the armrest may be formed to have a substantially hat-shaped cross section that is projected to the vehicle lower side by including: a central lower surface located substantially at a center in the vehicle width direction; and a right and left pair of end lower surfaces located on both ends in the vehicle width direction of the central lower surface, and the right and left pair of end lower surfaces may be arranged substantially at the same positions in the vehicle width direction as both ends in the vehicle width direction of the terminal accommodation section.

With this configuration, the center console structure for the vehicle can secure the longer distance in the vehicle up-down direction between the lower surface of the armrest and the console side surface section. Therefore, the center console structure for the vehicle can further facilitate placement/taking out of the mobile terminal along the vehicle width direction.

Advantages

According to the present disclosure, it is possible to provide the center console structure for the vehicle capable of facilitating placement/taking out of the mobile terminal and capable of charging the mobile terminal while inhibiting the inattentive driving by the occupant.

BRIEF DESCRIPTION OF THE DRAWINGS

FIG. 9 is an explanatory view for explaining a relationship between a mobile terminal and a virtual area.

DETAILED DESCRIPTION

A description will hereinafter be made on an embodiment of the present disclosure with reference to the drawings. A center console 1 in this embodiment has a charging function to wirelessly transmit electric power to a mobile terminal 2. A description will be made on a structure of such a center console 1 with reference to FIG. 1 to FIG. 9.

Figure 1:
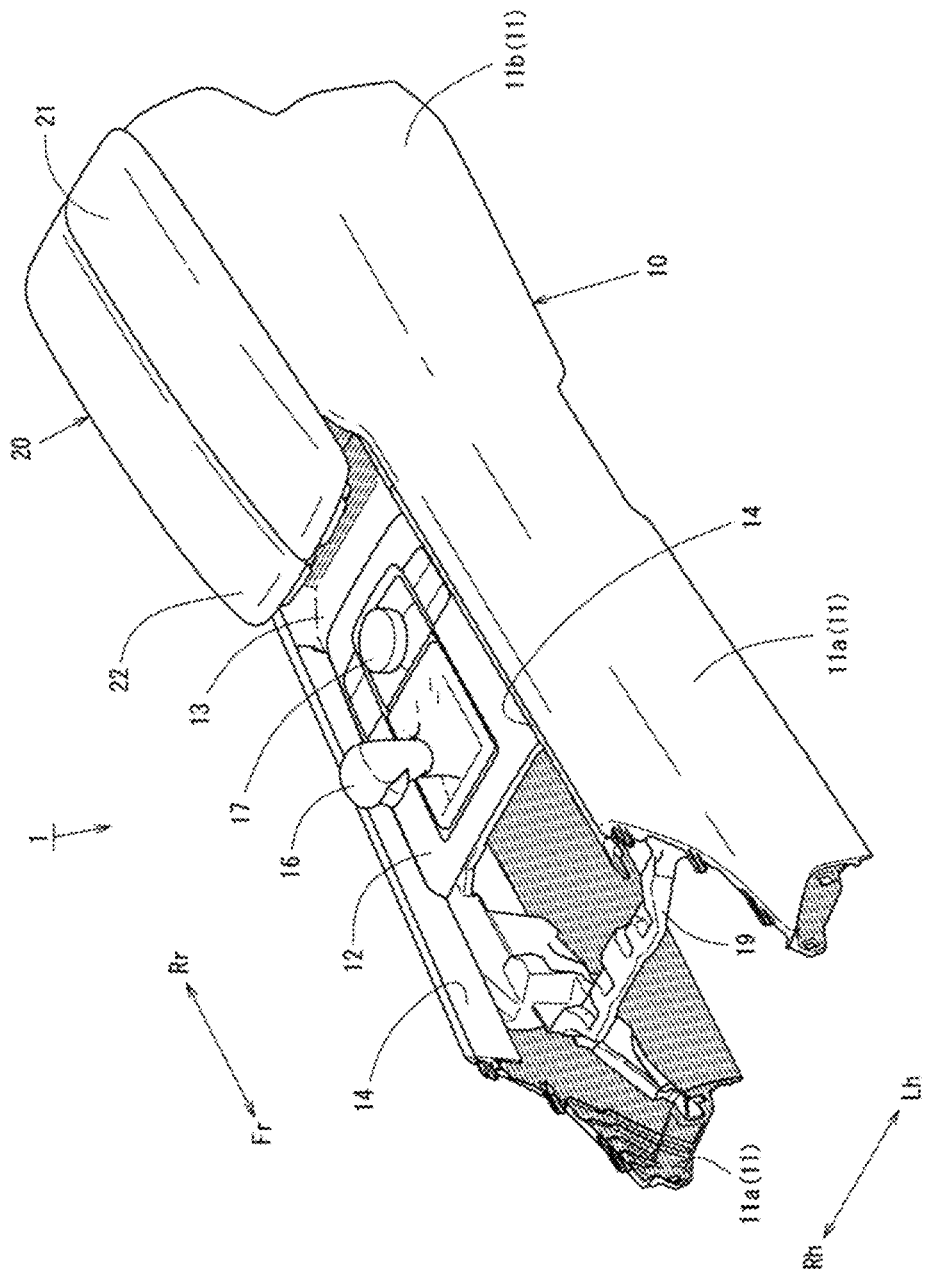
FIG. 1 is an external appearance perspective view illustrating external appearance of a center console that is seen from a vehicle upper front side.
Figure 2:
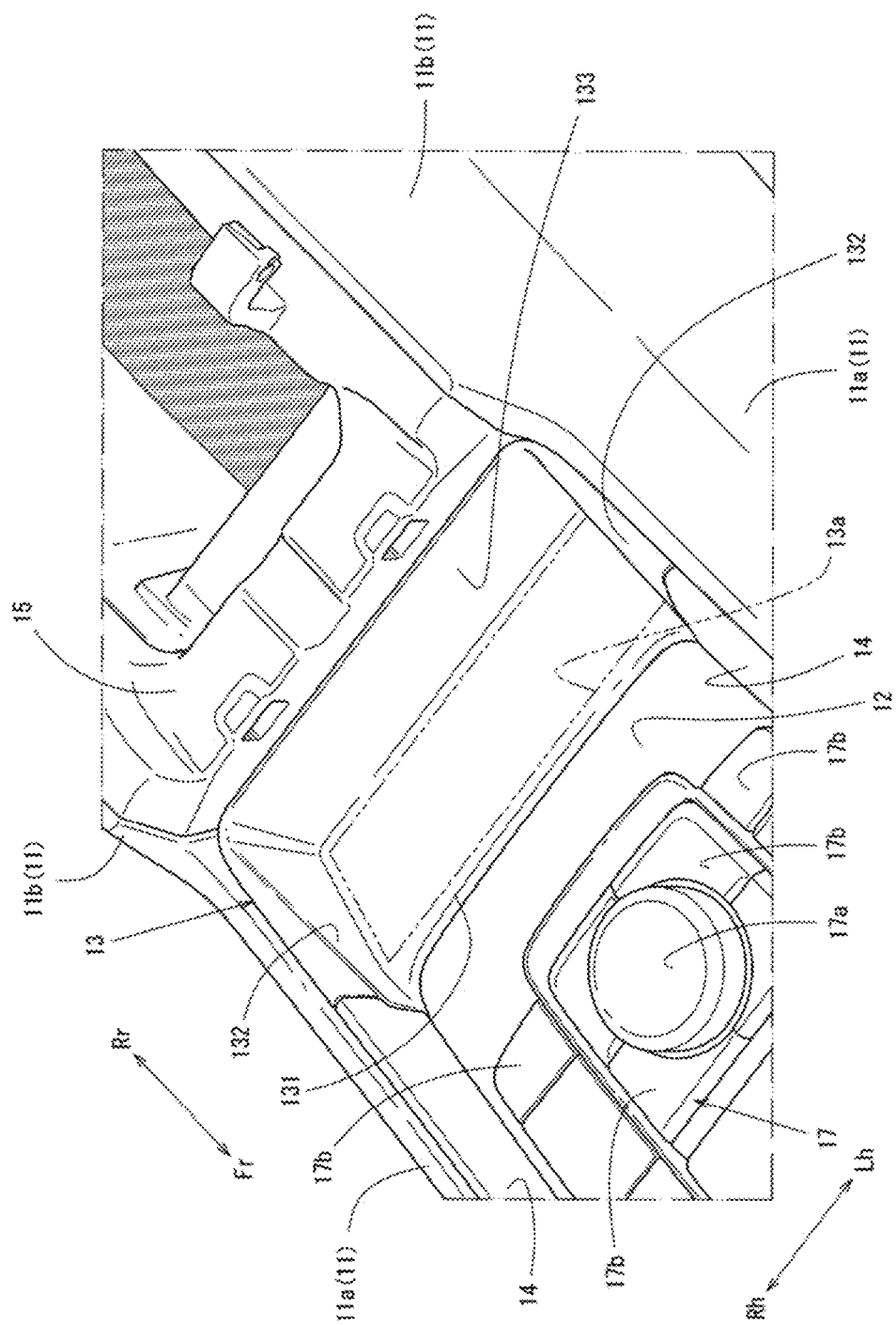
FIG. 2 is an external appearance perspective view illustrating external appearance of an area around a terminal accommodation section.
Figure 3:
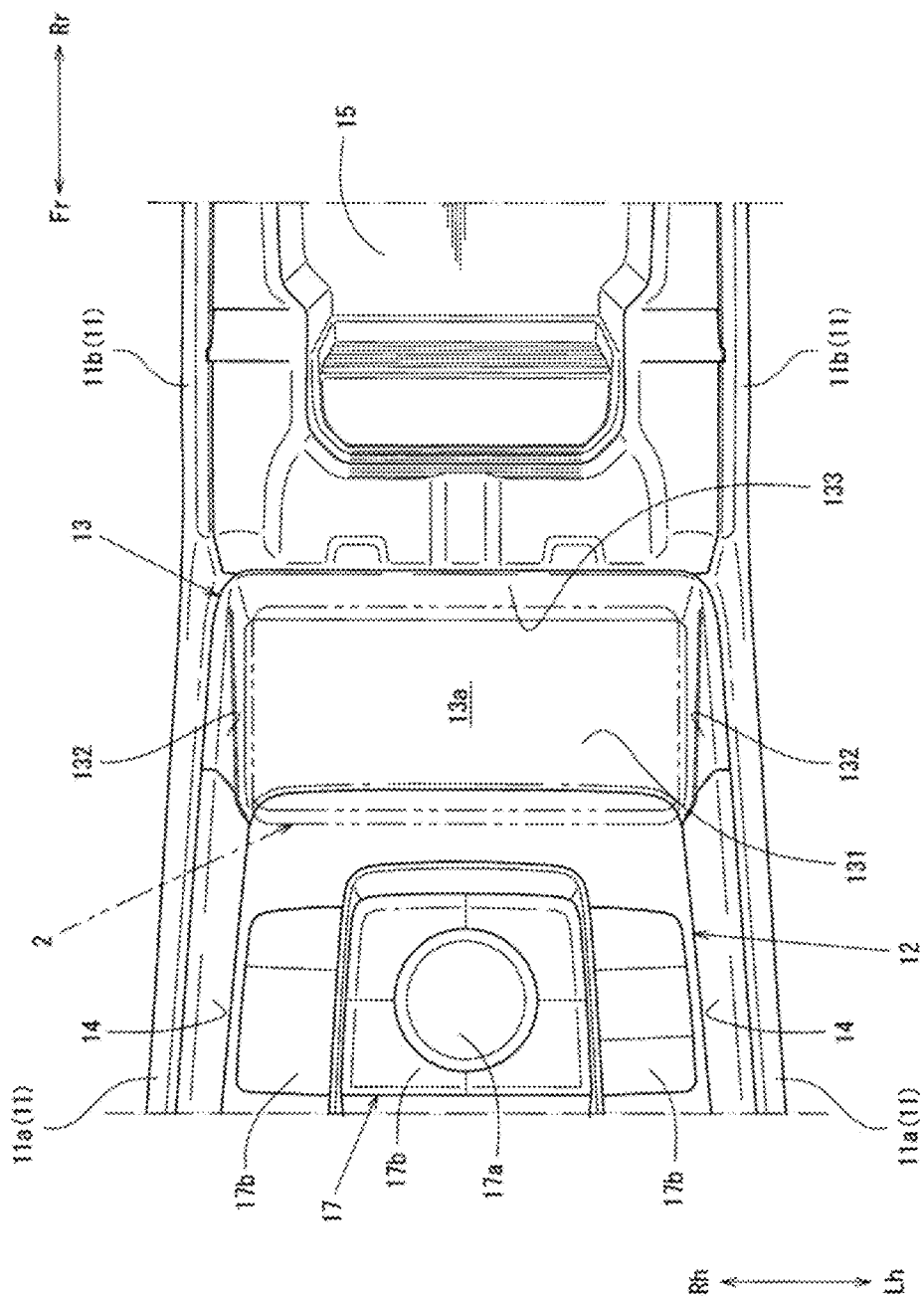
FIG. 3 is a plan view illustrating a console body.
Figure 4:
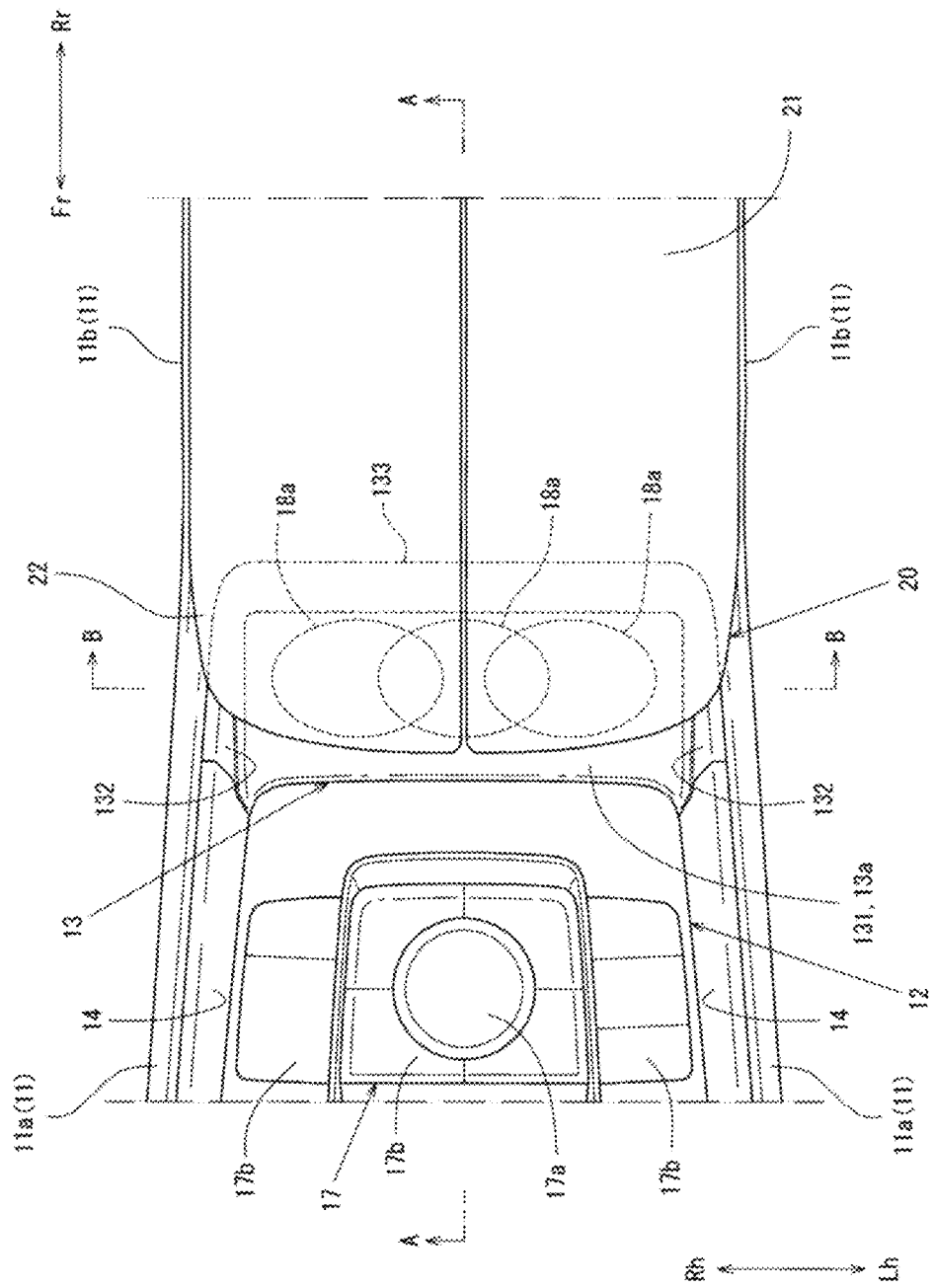
FIG. 4 is a plan view illustrating the center console.
Figure 5:
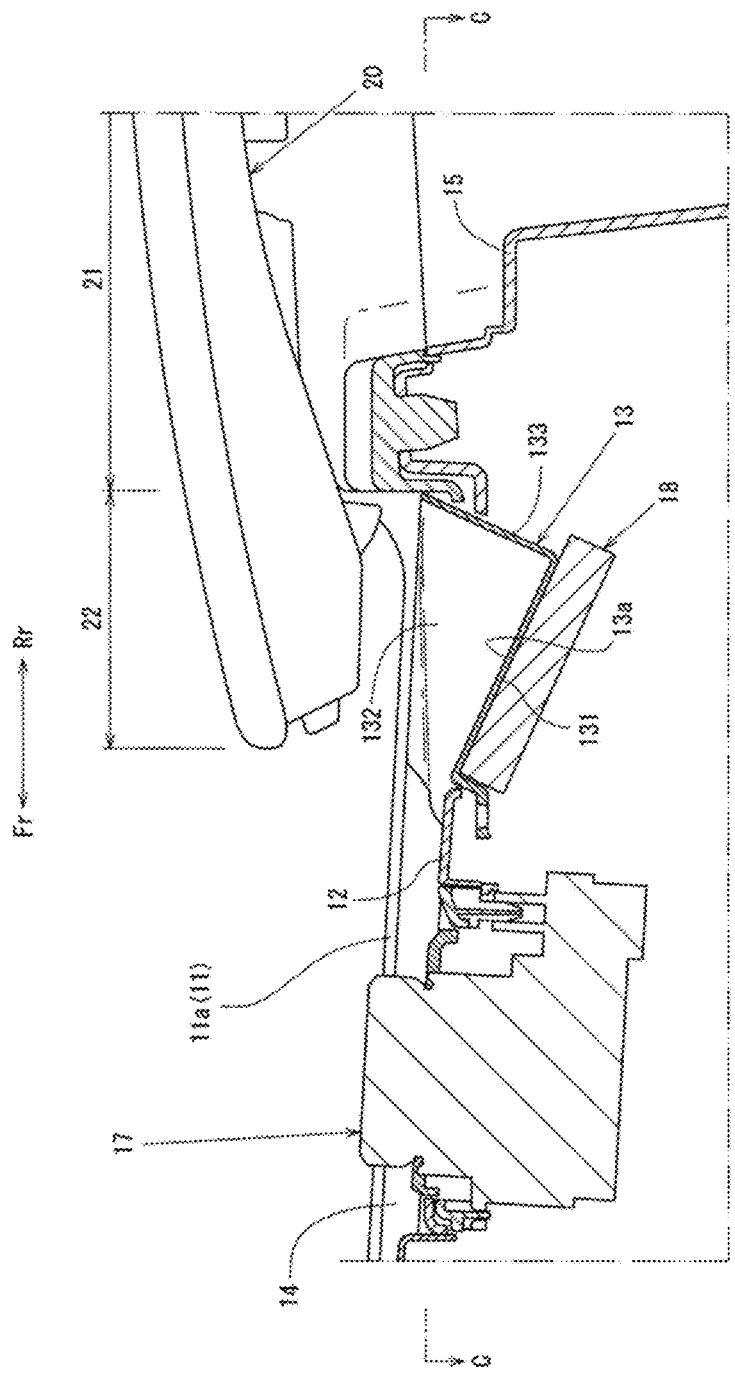
FIG. 5 is a cross-sectional view that is taken along arrow A-A in FIG. 4.

FIG. 1 is an external appearance perspective view of the center console 1 that is seen from a vehicle upper front side, FIG. 2 is an external appearance perspective view of an area around a terminal accommodation section 13, FIG. 3 is a plan view of a console body 10, FIG. 4 is a plan view of the center console 1, and FIG. 5 is a cross-sectional view that is taken along arrow A-A in FIG. 4.

Figure 6:
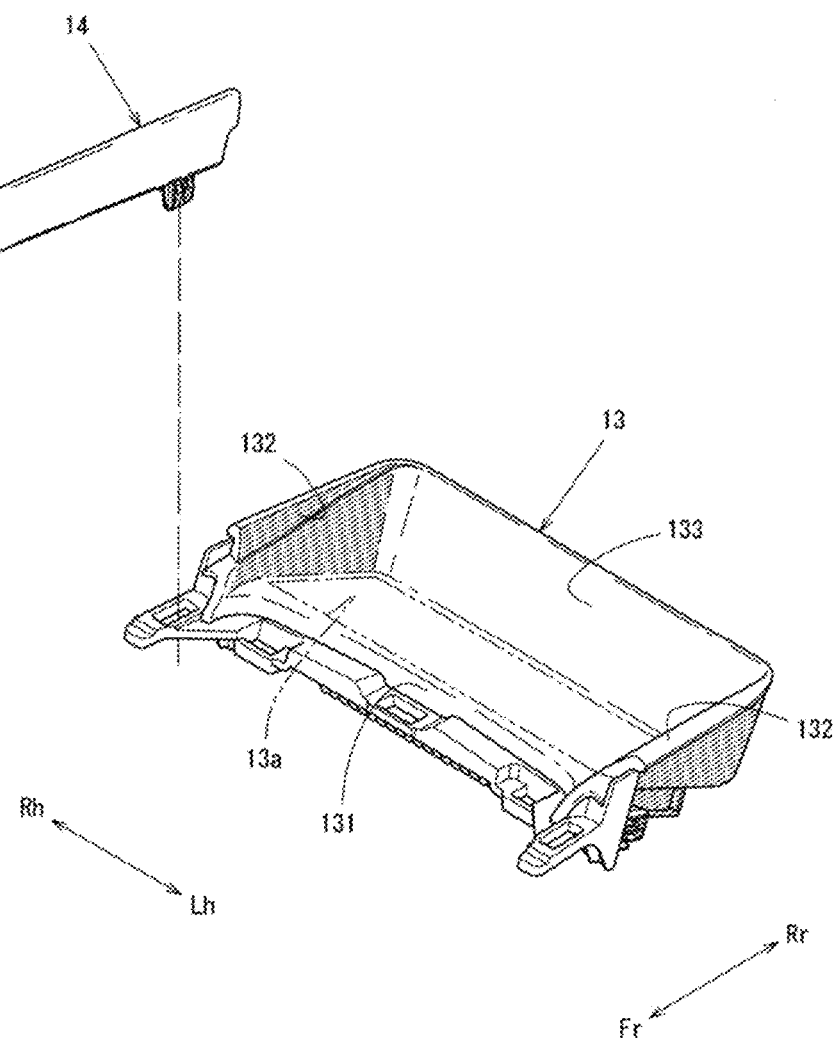
FIG. 6 is an external appearance perspective view illustrating the external appearance of the terminal accommodation section.
Figure 7:
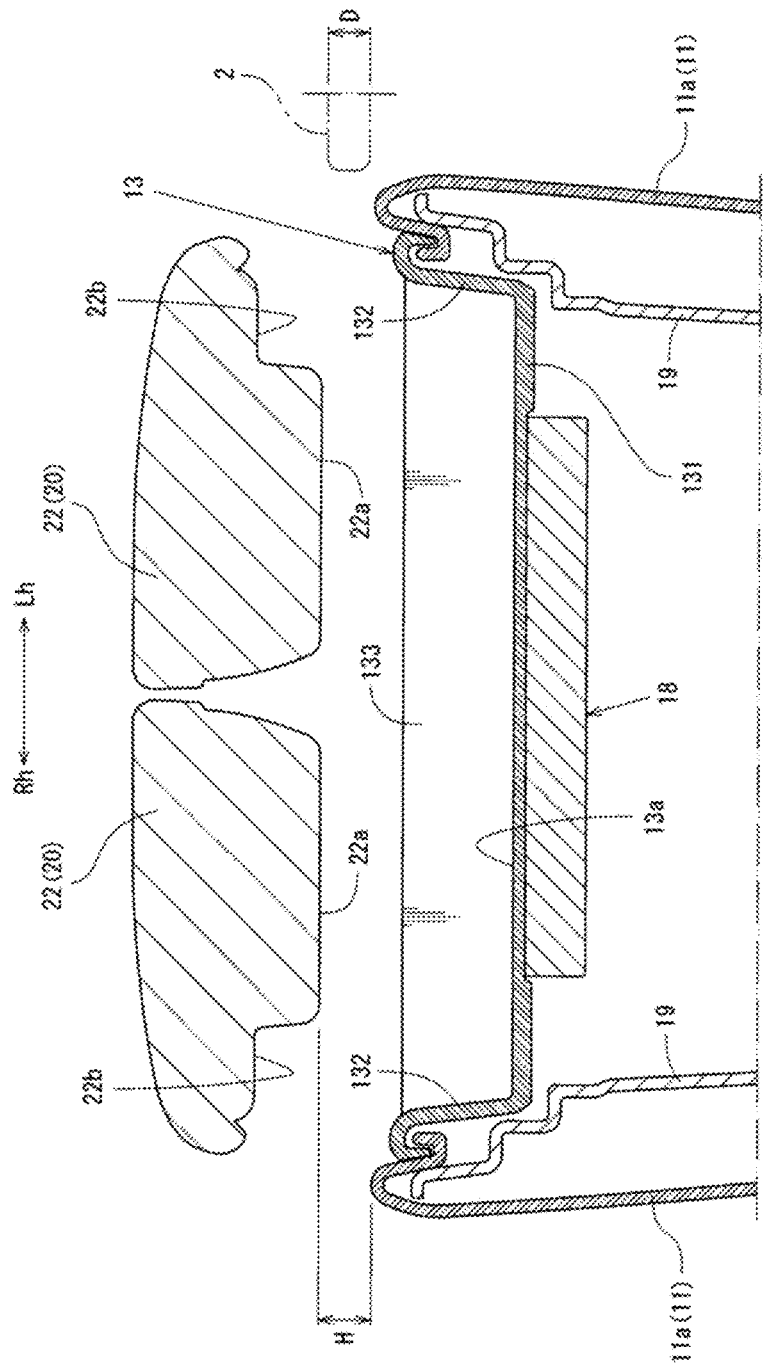
FIG. 7 is a cross-sectional view that is taken along arrow B-B in FIG. 4.
Figure 8:
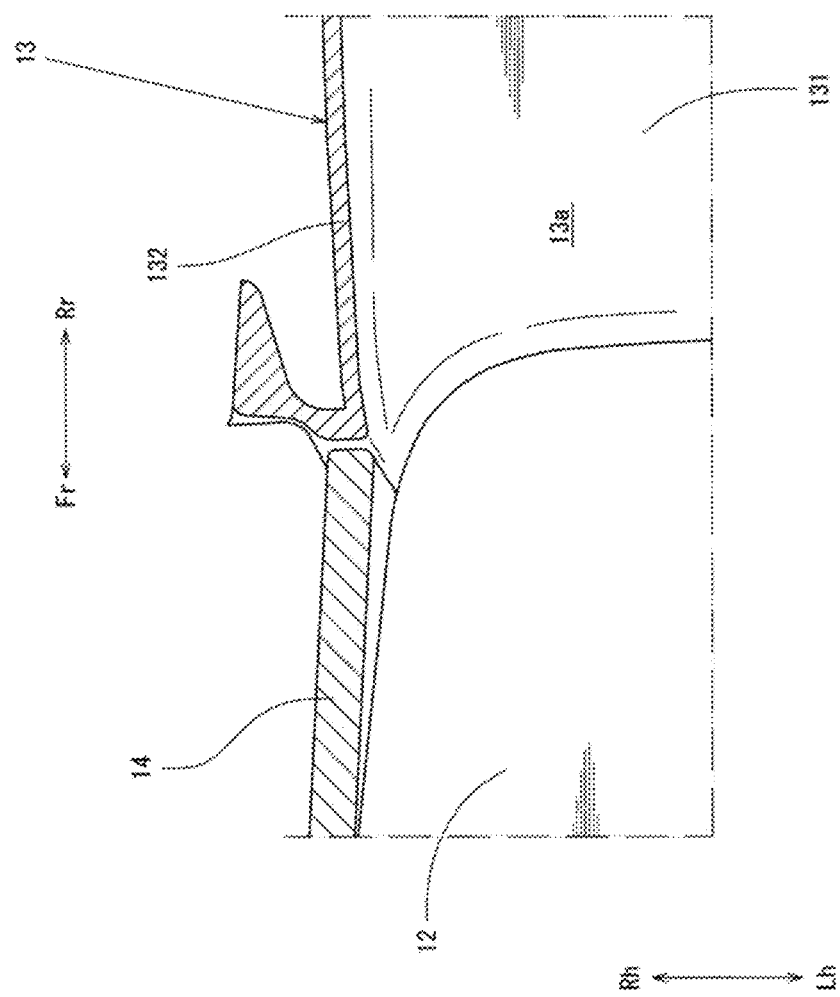
FIG. 8 is a cross-sectional view that is taken along arrow C-C in FIG. 5.

Furthermore, FIG. 6 is an external appearance perspective view of the terminal accommodation section 13, FIG. 7 is a cross-sectional view that is taken along arrow B-B in FIG. 4, FIG. 8 is a cross-sectional view that is taken along arrow C-C in FIG. 5, and FIG. 9 is an explanatory view for explaining a relationship between the mobile terminal 2 and a virtual area S.

In the drawings, in order to clarify the illustrations, the mobile terminal 2 is indicated by two-dot chain lines, and in FIG. 5, FIG. 7, FIG. 8, and FIG. 9, a body and a frame of the terminal accommodation section 13 are illustrated integrally.

In addition, in the drawings, an arrow Fr and an arrow Rr indicate a front-rear direction, the arrow Fr indicates a front direction, and the arrow Rr indicates a rear direction. Furthermore, an arrow Rh and an arrow Lh indicate a vehicle width direction, the arrow Rh indicates a right direction, and the arrow Lh indicates a left direction. Moreover, upper sides in the drawings indicate a vehicle upper side, and lower sides in the drawings indicate a vehicle lower side.

In a vehicle cabin, the center console 1 of this embodiment is arranged between right and left front seats, and a portion near a front end of the center console 1 is coupled to a lower portion of an instrument panel.

As illustrated in FIG. 1, this center console 1 is constructed of: a console body 10 extending in the vehicle front-rear direction; and an armrest 20 arranged in a rear portion and on top of the console body 10.

As illustrated in FIG. 1, the console body 10 includes: a right and left pair of console side surface sections 11 that oppose each other in the vehicle width direction and serve as side surfaces; a top plate section 12 and the terminal accommodation section 13 that are disposed between the console side surface sections 11 and serve as an upper surface of the console body 10; and a right and left pair of decorative panels 14 arranged on both sides in the vehicle width direction of the top plate section 12.

Furthermore, as illustrated in FIG. 1 and FIG. 2, the console body 10 includes: a console box 15 arranged on a vehicle rear side of the terminal accommodation section 13; a shift lever 16 and an operation section 17 provided on the top plate section 12; a power supply section 18 (see FIG. 5) arranged on a vehicle lower side of the terminal accommodation section 13; and a support member 19 supporting these components.

More specifically, as illustrated in FIG. 1, the right and left pair of the console side surface sections 11 is panel members that are long in the vehicle front-rear direction and constitutes external appearance design surfaces of the center console 1. As illustrated in FIG. 1, each of these console side surface sections 11 is formed by coupling a side surface front section 11a that is long in the vehicle front-rear direction and a side surface rear section 11b longer in the vehicle up-down direction than the side surface front section 11a in this order from a vehicle front side.

In detail, the side surface front section 11a is formed in such a shape that an upper end thereof is folded to the other console side surface section 11 side and to the vehicle lower side (see FIG. 7). In side view, an upper end edge of this side surface front section 11a is gradually inclined to the vehicle lower side toward the vehicle rear side (see FIG. 5).

Meanwhile, as illustrated in FIG. 1, the side surface rear section 11b is integrally formed on the vehicle rear side of the side surface front section 11a in such a manner that an upper end edge thereof is located at a position on a vehicle upper side of the upper end edge of the side surface front section 11a.

As illustrated in FIG. 1, the top plate section 12 is a panel member having a thickness in the up-down direction and is formed such that a front end thereof continues from the instrument panel. As illustrated in FIG. 1, this top plate section 12 is arranged such that, at a substantial center in the vehicle front-rear direction of the side surface front section 11a in the console side surface section 11, an upper surface of the top plate section 12 is located at a position on the vehicle lower side of the upper end edge of the side surface front section 11a.

As illustrated in FIG. 1 and FIG. 2, at a position between the right and left console side surface sections 11, the terminal accommodation section 13 is disposed on the vehicle rear side of the top plate section 12 and is formed such that an upper surface thereof continues from the upper surface of the top plate section 12.

Furthermore, as illustrated in FIG. 3 to FIG. 5, the upper surface of the terminal accommodation section 13 is formed as a placement surface 13a on which the mobile terminal 2 is placed in a state where a longitudinal direction thereof substantially matches the vehicle width direction.

The above-described top plate section 12 and the above-described terminal accommodation section 13 are formed such that, in a state where the mobile terminal 2 is placed on the placement surface 13a, a front end 2a of the mobile terminal 2 is separated to the vehicle upper side from the upper surface of the top plate section 12 (see FIG. 9).

As illustrated in FIG. 1, the right and left pair of the decorative panels 14 is substantially belt-shaped panel members that are long in the vehicle front-rear direction and is arranged to oppose each other in the vehicle width direction on inner sides in the vehicle width direction of the console side surface sections 11.

As illustrated in FIG. 1, each of these decorative panels 14 is disposed to cover a clearance between the console side surface section 11 and the upper surface of the top plate section 12.

As illustrated in FIG. 5, in side view, the decorative panel 14 is formed such that an upper end edge thereof is substantially parallel to the upper end edge of the console side surface section 11.

As illustrated in FIG. 2 and FIG. 3, the console box 15 is a substantially box-shaped member that is opened to the vehicle upper side, and is arranged on the vehicle rear side of the terminal accommodation section 13 and between the side surface rear sections 11b.

As illustrated in FIG. 5, this console box 15 is arranged such that, in a perpendicular cross section along the vehicle front-rear direction, an upper end thereof is located at substantially the same position in the vehicle up-down direction as the upper end edge of the side surface rear section 11b.

That is, the console box 15 is arranged such that the upper end thereof is located at a position on the vehicle upper side of the upper surface of the top plate section 12 and an upper end of the terminal accommodation section 13.

The shift lever 16 is a lever that accepts an occupant's operation to shift a gear stage of a transmission of the vehicle. As illustrated in FIG. 1, this shift lever 16 is arranged in a vehicle front portion and substantially at the center in the vehicle width direction of the top plate section 12.

As illustrated in FIG. 1, at a position on the vehicle rear side of the shift lever 16 and on the vehicle front side of the armrest 20, the operation section 17 is arranged on the upper surface of the top plate section 12. As illustrated in FIG. 3, this operation section 17 is constructed of: a substantially cylindrical dial 17a arranged substantially at the center in the vehicle width direction; and plural buttons 17b arranged around the dial 17a, and has functions of accepting operations related to various vehicle settings and an operation of a navigation system, for example.

The power supply section 18 is a device that is connected to a power supply and wirelessly transmits the electric power to the mobile terminal 2 via the placement surface 13a of the terminal accommodation section 13. As illustrated in FIG. 5, this power supply section 18 is arranged to abut the terminal accommodation section 13 (a bottom surface portion 131, which will be described below) from the vehicle lower side.

The armrest 20 is a portion on which the occupant's forearm (from an elbow to a wrist) is placed. As illustrated in FIG. 1 to FIG. 4, the armrest 20 is formed to have a length in the vehicle front-rear direction from a rear end of the console body 10 to a portion near a rear end of the top plate section 12.

This armrest 20 is supported by the console box 15 in a freely openable/closable manner so as to function as a lid that covers the opening of the console box 15.

As illustrated in FIG. 1, the armrest 20 has a shape that is bilaterally divided substantially at the center in the vehicle width direction. However, a description will herein be made on the assumption that the armrest 20 is integrated.

More specifically, as illustrated in FIG. 1 and FIG. 5, the armrest 20 is constructed of: an armrest rear section 21 that serves as the lid covering the opening of the console box 15; and an armrest front section 22 that is projected to the vehicle front side from the armrest rear section 21 and opposes the placement surface 13a of the terminal accommodation section 13 in the vehicle up-down direction.

As illustrated in FIG. 4, in plan view, the armrest front section 22 extends from the armrest rear section 21 to have such a length in the vehicle front-rear direction not projected to the vehicle front side from the placement surface 13a of the terminal accommodation section 13.

Furthermore, as illustrated in FIG. 4, in plan view, the armrest front section 22 is formed to expose corners on the vehicle front side of the placement surface 13a of the terminal accommodation section 13. In detail, as illustrated in FIG. 4, the armrest front section 22 is formed to have a front end edge in a substantially curved shape in plan view in which a substantially central portion in the vehicle width direction is curved to be projected to the vehicle front side.

The description will be continued on further details of the terminal accommodation section 13, the power supply section 18, and the armrest 20 in the center console 1 with the above-described configuration and will also be made on a relative positional relationship with the mobile terminal 2 that is placed on the terminal accommodation section 13.

As illustrated in FIG. 6, the terminal accommodation section 13 is constructed of: a substantially box-shaped body (not denoted by a reference numeral) which has the placement surface 13a, and the vehicle upper side and the vehicle front side of which are opened; and a frame (not denoted by a reference numeral) supporting the body. The frame is formed with an opening with which the decorative panels 14 is engaged and an opening with which the top plate section 12 is engaged, for example.

As illustrated in FIG. 5 and FIG. 6, this terminal accommodation section 13 includes: the bottom surface portion 131, an upper surface of which serves as the placement surface 13a; a right and left pair of side wall portions 132 vertically provided from both ends in the vehicle width direction of the bottom surface portion 131; and a rear wall portion 133 vertically provided from a rear end of the bottom surface portion 131.

More specifically, as illustrated in FIG. 3, in plan view, the bottom surface portion 131 is formed to have a shorter length in the vehicle front-rear direction than a length of the mobile terminal 2 in the vehicle front-rear direction. As illustrated in FIG. 5, in the perpendicular cross section along the vehicle front-rear direction, this bottom surface portion 131 is formed in a substantially plate shape which opposes a lower surface of the armrest front section 22 with a specified distance being provided on the vehicle lower side thereof and in which a rear end is arranged to be located on the vehicle lower side of a front side.

In detail, as illustrated in FIG. 5, in the perpendicular cross section along the vehicle front-rear direction, the bottom surface portion 131 is formed such that the placement surface 13a as the upper surface is inclined at an angle of 15° with respect to a substantially horizontal virtual linear line.

The right and left pair of the side wall portions 132 is formed as restraint sections that restrain a position in the vehicle width direction of the mobile terminal 2.

Further in detail, as illustrated in FIG. 6 and FIG. 7, the right and left pair of the side wall portions 132 is vertically provided from both of the ends in the vehicle width direction of the bottom surface portion 131 toward the vehicle upper side and slightly toward the outer side in the vehicle width direction. As illustrated in FIG. 2, FIG. 3, and FIG. 5, each of these side wall portions 132 is formed such that a front end thereof is located at a position on the vehicle front side of the front end of the bottom surface portion 131.

As illustrated in FIG. 8, in a horizontal cross section along the vehicle front-rear direction, a surface on the inner side in the vehicle width direction of the side wall portion 132 is formed to continue from a surface on the inner side in the vehicle width direction of the decorative panel 14.

Furthermore, as illustrated in FIG. 5 and FIG. 7, in side view, the side wall portion 132 is formed in such a shape that an upper end edge thereof is substantially parallel to the upper end edge of the console side surface section 11 and continues from the upper end edge of the decorative panel 14.

As illustrated in FIG. 9, in the perpendicular cross section along the vehicle front-rear direction, as a positioning portion that positions the front end 2a of the mobile terminal 2 placed on the placement surface 13a, the rear wall portion 133 is provided substantially vertically with respect to the placement surface 13a.

As illustrated in FIG. 9, the mobile terminal 2 is a terminal having a terminal width W, as a length along a substantially parallel direction to the placement surface 13a, that is equal to or longer than 67 mm and equal to or shorter than 84 mm.

Further in detail, as illustrated in FIG. 9, when a virtual linear line that connects a front end 20a of the armrest 20 and a rear end 17c of the operation section 17 is set as a first virtual linear line VL1, the rear wall portion 133 of the terminal accommodation section 13 is vertically provided such that the front end 2a of the mobile terminal 2 is located on the vehicle rear side of the first virtual linear line VL1 on the vehicle upper side of the top plate section 12.

Furthermore, as illustrated in FIG. 9, when a substantially vertical virtual linear line that passes a position separated on the vehicle front side from the front end 20a of the armrest 20 by a specified distance L is set as a second virtual linear line VL2, the rear wall portion 133 is vertically provided such that the front end 2a of the mobile terminal 2 is located on the vehicle front side of the second virtual linear line VL2 and on the vehicle upper side of the top plate section 12. Here, the above-described specified distance L is in size of a fingertip of a large adult male and is set to 18 mm, for example.

That is, as illustrated in FIG. 9, in the perpendicular cross section along the vehicle front-rear direction, the rear wall portion 133 is vertically provided at a position in the vehicle front-rear direction that causes the front end 2a of the mobile terminal 2 to be located in a virtual area S that is a polygonal area surrounded by the first virtual linear line VL1, the second virtual linear line VL2, and the top plate section 12.

Such a virtual area S is set as an area that makes entry of the occupant's fingertip difficult at the time when the occupant operates the operation section 17 in a state of placing his/her forearm on the armrest front section 22 and an area that does not interfere with the placement/taking out of the mobile terminal 2 along the vehicle front-rear direction in the same state.

The power supply section 18 is a device that wirelessly transmits the electric power to the mobile terminal 2 by generating an induced electromotive force to a power-receiving coil of the mobile terminal 2, for example, at the time when the mobile terminal 2 is placed on the placement surface 13a of the terminal accommodation section 13. As illustrated in FIG. 4, three power-transmission coils 18a aligned in the vehicle width direction are installed in this power supply section 18.

The three power-transmission coils 18a are arranged such that, in the vehicle up-down direction, the power-transmission coil 18a substantially at the center in the vehicle width direction overlaps the two power-transmission coils 18a at both ends in the vehicle width direction.

Furthermore, as illustrated in FIG. 4, in plan view, the power supply section 18 is arranged such that the three power-transmission coils 18a overlap the placement surface 13a of the terminal accommodation section 13 and the armrest front section 22 in the vehicle up-down direction.

In addition, as illustrated in FIG. 5, in the perpendicular cross section along the vehicle front-rear direction, in the armrest 20, a lower surface of the armrest rear section 21 is formed as an inclined surface that is inclined to the vehicle lower side toward the vehicle front side, and the lower surface of the armrest front section 22 is formed as an inclined surface, a front end of which is located slightly on the vehicle upper side of a rear end.

Furthermore, as illustrated in FIG. 7, and FIG. 9, within an area in the vehicle front-rear direction that is substantially the same as the terminal accommodation section 13, the lower surface of the armrest front section 22 is formed at a position that is separated to the vehicle upper side from the upper end edge of the console side surface section 11 by a longer vertical distance H than a thickness D of the mobile terminal 2.

In detail, as illustrated in FIG. 7, in a perpendicular cross section along the vehicle width direction, the armrest front section 22 is formed to have a substantially projected cross section in which a substantially central portion thereof in the vehicle width direction is projected to the vehicle lower side.

Accordingly, as illustrated in FIG. 7, the lower surface of the armrest front section 22 is formed to have a substantially hat-shaped cross section including: a central lower surface 22a substantially at the center in the vehicle width direction; and an end lower surface 22b located on each side in the vehicle width direction of the central lower surface 22a and located on the vehicle upper side of the central lower surface 22a.

In addition, as illustrated in FIG. 7, the central lower surface 22a of the armrest front section 22 is formed at the position that is separated to the vehicle upper side from the upper end edge of the console side surface section 11 by the longer vertical distance H than the thickness D of the mobile terminal 2.

Thus, a distance in the vehicle up-down direction between the central lower surface 22a of the armrest front section 22 and the upper end of the terminal accommodation section 13 is longer than the thickness D of the mobile terminal 2.

Meanwhile, as illustrated in FIG. 7, in the perpendicular cross section along the vehicle width direction, the end lower surface 22b of the armrest front section 22 is formed such that an end portion thereof on the outer side in the vehicle width direction is located at substantially the same position in the vehicle width direction as the side wall portion 132 of the terminal accommodation section 13.

With such a configuration, as illustrated in FIG. 7 and FIG. 9, in the center console 1, a space into/from which the mobile terminal 2 can be placed/taken out along the vehicle width direction is formed between the lower surface of the armrest front section 22 and the upper end edge of the console side surface section 11.

Furthermore, in the center console 1, a space into/from which the mobile terminal 2 can be placed/taken out along the vehicle front-rear direction is formed between the lower surface of the armrest front section 22 and the placement surface 13a of the terminal accommodation section 13.

As it has been described so far, the center console structure for the vehicle in this embodiment includes: the console body 10 extending in the vehicle front-rear direction in the vehicle cabin; the armrest 20 arranged on top of the console body 10; and the power supply section 18 that wirelessly transmits the electric power to the mobile terminal 2 via the placement surface 13a on which the mobile terminal 2 is placed.

This console body 10 includes: the top plate section 12 serving as the upper surface in a front portion of the console body 10; and the terminal accommodation section 13 that has the placement surface 13a, is arranged on the vehicle rear side of the top plate section 12 and on the vehicle lower side of the armrest front section 22, and serves as the upper surface of the console body 10.

Furthermore, the console body 10 includes the right and left pair of the console side surface sections 11 arranged to oppose each other in the vehicle width direction with the terminal accommodation section 13 being interposed therebetween.

In addition, the lower surface of the armrest front section 22 is formed at the position that is separated to the vehicle upper side from the upper end of the console side surface section 11 and the upper end of the terminal accommodation section 13 by the longer vertical distance H than the thickness D of the mobile terminal 2.

According to the above, the center console structure for the vehicle can facilitate placement/taking out of the mobile terminal 2 and can charge the mobile terminal 2 while inhibiting inattentive driving by the occupant.

More specifically, since the armrest front section 22 is located on the vehicle upper side of the terminal accommodation section 13, in the center console structure for the vehicle, the armrest 20 can be interposed between the mobile terminal 2 that is being charged and the occupant's head.

Accordingly, even when the occupant who is driving moves his/her line of sight to the mobile terminal 2 that is being charged, for example, in the center console structure for the vehicle, the armrest 20 can hide the mobile terminal 2 from the occupant's eyesight.

Furthermore, since the lower surface of the armrest front section 22 and the upper end of the console side surface section 11 are mutually separated by the longer vertical distance H than the thickness D of the mobile terminal 2, in the center console structure for the vehicle, the opened space can be formed along the vehicle width direction at the position between the armrest 20 and the console side surface section 11.

Moreover, since the lower surface of the armrest 20 and the upper end of the terminal accommodation section 13 are mutually separated by the longer vertical distance H than the thickness D of the mobile terminal 2, in the center console structure for the vehicle, the opened space can be formed along the vehicle front-rear direction at the position between the armrest 20 and the terminal accommodation section 13.

Accordingly, the occupant can place/take out the mobile terminal 2 along the vehicle front-rear direction or place/take out the mobile terminal 2 along the vehicle width direction without opening/closing the armrest 20, for example.

In this way, compared to a case where the terminal accommodation section 13 is provided in the console box 15, the center console structure for the vehicle can facilitate placement/taking out of the mobile terminal 2 and can charge the mobile terminal 2 while inhibiting the inattentive driving by the occupant.

In plan view, the power supply section 18 is arranged to overlap both of the armrest front section 22 and the placement surface 13a of the terminal accommodation section 13.

With this configuration, in the center console structure for the vehicle, the armrest 20 can reliably be interposed between the mobile terminal 2 that is being charged and the occupant's head.

Thus, the center console structure for the vehicle can reliably hide the mobile terminal 2 from the occupant's eyesight.

In this way, the center console structure for the vehicle can reliably inhibit the inattentive driving by the occupant without interfering with placement/taking out of the mobile terminal 2.

The placement surface 13a of the terminal accommodation section 13 is formed as the inclined surface that continues from the top plate section 12 and is inclined such that the rear end thereof is located on the vehicle lower side with respect to the front end.

With this configuration, compared to a case where the placement surface of the terminal accommodation section is substantially horizontal, the center console structure for the vehicle can further facilitate placement/taking out of the mobile terminal 2 along the vehicle front-rear direction.

In addition, compared to the case where the placement surface of the terminal accommodation section is substantially horizontal, it is possible to suppress extension of the length of the placement surface 13a in the vehicle front-rear direction. Thus, the center console structure for the vehicle can downsize the terminal accommodation section 13.

As a result, the center console structure for the vehicle can suppress a reduction in capacity of the console box 15 caused by the terminal accommodation section 13.

In this way, the center console structure for the vehicle can further facilitate placement/taking out of the mobile terminal 2 without degrading functionality of the console body 10.

The terminal accommodation section 13 includes the right and left pair of the side wall portions 132 vertically provided toward the vehicle upper side from both of the ends in the vehicle width direction of the placement surface 13a.

The console body 10 further includes the decorative panels 14, each of which is adjacently provided on the vehicle front side of the side wall portion 132 of the terminal accommodation section 13 in the manner to continue from the side wall portion 132.

The side wall portion 132 is formed in the shape that has the front end located on the vehicle front side of the front end of the placement surface 13a.

With this configuration, the center console structure for the vehicle can suppress degraded appearance of the console body 10, which is associated with placement/taking out of the mobile terminal 2.

More specifically, for example, in the case where the front end of the placement surface 13a and the front end of the side wall portion 132 are located at substantially the same positions in the vehicle front-rear direction, at the time when the mobile terminal 2 is placed on the placement surface 13a in the vehicle width direction, the mobile terminal 2 possibly comes in contact with the decorative panel 14 and scratches the decorative panel 14.

To handle such a problem, the front end of the side wall portion 132 is located on the vehicle front side of the front end of the placement surface 13a. Accordingly, even in the case where the mobile terminal 2 is placed on the placement surface 13a in the vehicle width direction, the center console structure for the vehicle can suppress a scratch on the decorative panel 14 by the side wall portion 132 of the terminal accommodation section 13.

Therefore, the center console structure for the vehicle can suppress the degraded appearance of the console body 10, which is associated with placement/taking out of the mobile terminal 2.

In the perpendicular cross section along the vehicle width direction, the lower surface of the armrest front section 22 is formed to have the substantially hat-shaped cross section that is projected to the vehicle lower side by including: the central lower surface 22a substantially at the center in the vehicle width direction; and a right and left pair of the end lower surfaces 22b located on both ends in the vehicle width direction of the central lower surface 22a.

The right and left pair of the end lower surfaces 22b is arranged at substantially the same positions in the vehicle width direction as both of the ends in the vehicle width direction of the terminal accommodation section 13.

With this configuration, the center console structure for the vehicle can secure the longer distance in the vehicle up-down direction between the lower surface of the armrest front section 22 and the console side surface section 11. Therefore, the center console structure for the vehicle can further facilitate placement/taking out of the mobile terminal 2 along the vehicle width direction.

In regard to correspondence between the configuration in the present disclosure and the above-described embodiment, the lower surface of the armrest in the present disclosure corresponds to the lower surface of the armrest front section 22 in the embodiment. Hereinafter, similarly, the specified distance corresponds to the vertical distance H. However, the present disclosure is not limited to the configuration in the above-described embodiment but can implement any of various embodiments.

For example, in the above-described embodiment, the armrest 20 is bilaterally divided. However, the present disclosure is not limited thereto. The armrest may not be bilaterally divided.

In addition, the armrest 20 is supported by the console body 10. However, the present disclosure is not limited thereto. The armrest may be supported by a portion other than the console body 10, for example, a seatback of the front seat.

The armrest 20 has the substantially projected cross section that is projected to the vehicle lower side. However, the present disclosure is not limited thereto. As long as the vertical distance H is longer than the thickness D of the mobile terminal 2, the armrest may have the flat lower surface.

The top plate section 12 includes the shift lever 16 and the operation section 17. However, the present disclosure is not limited thereto. The top plate section may not include the shift lever 16 and the operation section 17. Alternatively, the top plate section may only include the shift lever 16, or the top plate section may only include the operation section 17.

In the case of the top plate section that only includes the shift lever 16, the first virtual linear line VL1 is a virtual linear line that connects the front end 20a of the armrest 20 and the rear end of the shift lever 16.

In addition, the second virtual linear line VL2 is set as the virtual linear line that passes the position separated from the front end 20a of the armrest 20 by the specified distance L. However, the present disclosure is not limited thereto. A substantially vertical virtual linear line that passes the position of the front end 20a of the armrest 20 may be set as the second virtual linear line VL2.

What is claimed is:

1. A center console structure for a vehicle, comprising:
   a console body that extends in a vehicle front-rear direction in a vehicle cabin;
   an armrest that is arranged on a vehicle upper side of said console body; and
   a power supply section that wirelessly transmits electric power to a mobile terminal via a placement surface on which the mobile terminal is placed, wherein
   the console body includes a top plate section serving as an upper surface in a front portion of the console body; a terminal accommodation section that has the placement surface, is arranged on a vehicle rear side of the top plate section and on a vehicle lower side of the armrest, and serves as an upper surface of the console body; and a right and left pair of console side surface sections arranged to oppose each other in a vehicle width direction with said terminal accommodation section being interposed therebetween, and
   a lower surface of the armrest that opposes the terminal accommodation section is formed at a position that is separated to the vehicle upper side from an upper end of the console side surface section and an upper end of the terminal accommodation section by a longer specified distance than a thickness of the mobile terminal,
   wherein the placement surface of the terminal accommodation section is formed as an inclined surface that continues from the top plate section and is inclined such that a rear end thereof is located on the vehicle lower side with respect to a front end,
   wherein in a perpendicular cross section along the vehicle width direction, the lower surface of the armrest is formed to have a substantially hat-shaped cross section that is projected to the vehicle lower side by including: a central lower surface located substantially at a center in the vehicle width direction; and a right and left pair of end lower surfaces located on both ends in the vehicle width direction of said central lower surface, and
   wherein the right and left pair of end lower surfaces is arranged substantially at the same positions in the vehicle width direction as both ends in the vehicle width direction of the terminal accommodation section.

2. The center console structure for the vehicle according to claim 1, wherein
   the power supply section is arranged to overlap both of the al crest and the placement surface of the terminal accommodation section.

3. The center console structure for the vehicle according to claim 1, wherein
   the terminal accommodation section includes a right and left pair of side wall portions vertically provided to the vehicle upper side from both ends in the vehicle width direction of the placement surface,
   the console body includes a decorative panel that is adjacently located on the vehicle front side of the side wall portion of the terminal accommodation section in a manner to continue from the side wall portion, and
   the side wall portion is formed in a shape that has a front end located on the vehicle front side of the front end of the placement surface.

4. The center console structure for the vehicle according to claim 1, wherein
   in a perpendicular cross section along the vehicle width direction, the lower surface of the armrest is formed to have a substantially hat-shaped cross section that is projected to the vehicle lower side by including: a central lower surface located substantially at a center in the vehicle width direction; and a right and left pair of end lower surfaces located on both ends in the vehicle width direction of said central lower surface, and
   the right and left pair of end lower surfaces is arranged substantially at the same positions in the vehicle width direction as both ends in the vehicle width direction of the terminal accommodation section.

5. The center console structure for the vehicle according to claim 3, wherein
   in a perpendicular cross section along the vehicle width direction, the lower surface of the armrest is formed to have a substantially hat-shaped cross section that is projected to the vehicle lower side by including: a central lower surface located substantially at a center in the vehicle width direction; and a right and left pair of end lower surfaces located on both ends in the vehicle width direction of said central lower surface, and
   the right and left pair of end lower surfaces is arranged substantially at the same positions in the vehicle width direction as both ends in the vehicle width direction of the terminal accommodation section.

6. A vehicle, comprising:
   a center console structure for the vehicle including
      a console body that extends in a vehicle front-rear direction in a vehicle cabin;
      an armrest that is arranged on a vehicle upper side of said console body; and
      a power supply section that wirelessly transmits electric power to a mobile terminal via a placement surface on which the mobile terminal is placed, wherein
      the console body includes a top plate section serving as an upper surface in a front portion of the console body; a terminal accommodation section that has the placement surface, is arranged on a vehicle rear side of the top plate section and on a vehicle lower side of the armrest, and serves as an upper surface of the console body; and a right and left pair of console side surface sections arranged to oppose each other in a vehicle width direction with said terminal accommodation section being interposed therebetween, and a lower surface of the armrest that opposes the terminal accommodation section is formed at a position that is separated to the vehicle upper side from an upper end of the console side surface section and an upper end of the terminal accommodation section by a longer specified distance than a thickness of the mobile terminal, wherein the power supply section is arranged to overlap both of the armrest and the placement surface of the terminal accommodation section, and wherein the placement surface of the terminal accommodation section is formed as an inclined surface that continues from the top plate section and is inclined such that a rear end thereof is located on the vehicle lower side with respect to a front end.

7. The vehicle of claim 6, wherein the terminal accommodation section includes a right and left pair of side wall portions vertically provided to the vehicle upper side from both ends in the vehicle width direction of the placement surface, the console body includes a decorative panel that is adjacently located on the vehicle front side of the side wall portion of the terminal accommodation section in a manner to continue from the side wall portion, and the side wall portion is formed in a shape that has a front end located on the vehicle front side of the front end of the placement surface.

\* \* \* \* \*